(12) United States Patent
Yoshida et al.

(10) Patent No.: US 7,470,483 B2
(45) Date of Patent: Dec. 30, 2008

(54) ELECTROLYTE MEMBRANE-ELECTRODE ASSEMBLY FOR FUEL CELL AND OPERATION METHOD OF FUEL CELL USING THE SAME

(75) Inventors: Akihiko Yoshida, Hirakata (JP); Yoshihiro Hori, Ikoma (JP); Osamu Sakai, Moriguchi (JP); Makoto Uchida, Hirakata (JP); Eiichi Yasumoto, Soraku-gun (JP); Shinya Kosako, Kobe (JP)

(73) Assignee: Panasonic Corporation, Osaka (JP)

( * ) Notice: Subject to any disclaimer, the term of this patent is extended or adjusted under 35 U.S.C. 154(b) by 789 days.

(21) Appl. No.: 10/730,256

(22) Filed: Dec. 9, 2003

(65) Prior Publication Data

US 2004/0131920 A1    Jul. 8, 2004

(30) Foreign Application Priority Data

Dec. 11, 2002  (JP)  ............................. 2002-359314

(51) Int. Cl.
*H01M 4/96*  (2006.01)
(52) U.S. Cl. .............................. 429/30; 429/34; 429/44
(58) Field of Classification Search .................. 429/30, 429/34, 36, 38, 44
See application file for complete search history.

(56) References Cited

U.S. PATENT DOCUMENTS

| | | | |
|---|---|---|---|
| 4,020,882 A | 5/1977 | Foulkes | |
| 4,248,682 A | 2/1981 | Lindstrom et al. | |
| 4,647,359 A | 3/1987 | Lindstrom | |
| 5,260,124 A | 11/1993 | Gaier | |
| 5,509,942 A | 4/1996 | Dodge | |
| 5,958,197 A | 9/1999 | Allen et al. | |
| 6,127,059 A | 10/2000 | Kato | |
| 6,444,347 B1 | 9/2002 | Ouvry et al. | |
| 6,444,602 B1 | 9/2002 | DeMarinis et al. | |
| 6,465,041 B1 | 10/2002 | Frisk et al. | |
| 6,630,269 B1 | 10/2003 | Barth et al. | |
| 6,638,883 B2 | 10/2003 | Gaffney et al. | |
| 2002/0197525 A1 | 12/2002 | Tomita et al. | |
| 2003/0008195 A1 | 1/2003 | Chiem et al. | |

(Continued)

FOREIGN PATENT DOCUMENTS

EP    1139476    10/2001

OTHER PUBLICATIONS

European Search Report dated Apr. 8, 2004.

*Primary Examiner*—Patrick Ryan
*Assistant Examiner*—Monique Wills
(74) *Attorney, Agent, or Firm*—Dickinson Wright, PLLC

(57) ABSTRACT

A carbon fiber woven fabric for use as a gas diffusion layer base material in a polymer electrolyte fuel cell has a surface that is smoothed and further optimized to inhibit non-uniform infiltration of a coating for water-repellent-layer formation, to provide an electrolyte membrane-electrode assembly suitable for operation under a high humidification condition. The gas diffusion layer base material may be a carbon fiber woven fabric, wherein a ratio of the area of gap portions where neither warp thread nor weft thread exists: $(10/W-Y)(10/Z-X)$ to the area of portions where warp thread is crossing weft thread: $XY$ mm$^2$ is in the range of about 1/1500 to about 1/5, where the carbon fiber woven fabric has a warp density of $Z$ threads/cm, a weft density of $W$ threads/cm, a warp thickness of $X$ mm and a weft thickness of $Y$ mm.

8 Claims, 2 Drawing Sheets

U.S. PATENT DOCUMENTS

| | | |
|---|---|---|
| 2003/0027471 A1 | 2/2003 | Shimazaki et al. |
| 2003/0064279 A1 | 4/2003 | Yoshida et al. |
| 2003/0082433 A1 | 5/2003 | Sano et al. |
| 2003/0098237 A1 | 5/2003 | Clark et al. |
| 2003/0106726 A1 | 6/2003 | Yoshii |
| 2003/0155240 A1 | 8/2003 | Ulkem |
| 2003/0190514 A1 | 10/2003 | Okada et al. |
| 2006/0257720 A1 * | 11/2006 | Hirahara et al. ............... 429/44 |

* cited by examiner

ELECTROLYTE MEMBRANE-ELECTRODE ASSEMBLY FOR FUEL CELL AND OPERATION METHOD OF FUEL CELL USING THE SAME

FIELD OF THE INVENTION

The present invention relates to an electrolyte membrane-electrode assembly for polymer electrolyte fuel cells, using a proton conductive polymer electrolyte membrane, and an operation method of a fuel cell using this electrolyte membrane-electrode assembly.

RELATED ART OF THE INVENTION

An electrolyte membrane-electrode assembly (MEA) for a polymer electrolyte fuel cell (PEFC) generally comprises a polymer electrolyte membrane interposed between a pair of electrodes. Each of the electrodes comprises a catalyst layer in contact with the polymer electrolyte membrane and a gas diffusion layer having a water repellent layer in contact with the catalyst layer. The MEA is supported from both sides thereof by separator plates including gas flow channels. Together with sealants for preventing gas leakage, the MEA and separator plates are clamped by a constant pressure to constitute a unit cell of a PEFC.

The separator plate includes a groove, extending from an inlet to an outlet of the separator plate, to form a gas flow channel for a reaction gas, such as a fuel gas or oxidant gas. The gas diffusion layer functions to diffuse a reaction gas, supplied through the gas flow channel, throughout the catalyst layer. The gas diffusion layer also functions to discharge excess water, produced in the cathode-side catalyst layer by the operation of the PEFC, to prevent it from impairing the diffusibility of the reaction gas. In particular, an important function of the gas diffusion layer is to prevent water produced by the operation of the PEFC from clogging the micropores within the gas diffusion layer and to make the produced water pass through the micropores so that it may smoothly reach the gas flow channel in the separator plate.

The gas diffusion layer is in contact with convex portions (libs) formed on each side of the respective gas flow channel in the separator plate. Through these libs, the gas diffusion layer is electrically connected to the separator plate. Hence, the gas diffusion layer serves to conduct a current, generated at the MEA, to the separator plate.

A water repellent layer is usually formed on the catalyst-layer-contacting-side of the gas diffusion layer, and a fluorocarbon resin is used as the water repellent material of the water repellent layer. The water repellent layer comprises an electron conductive material, such as carbon, together with the water repellent material. In the conventional commonly-used technique, a base material of the gas diffusion layer has a porous structure for providing gas diffusibility, and a water repellent layer is formed on the gas diffusion layer for controlling water penetrability. An electron conductive material, such as carbon fiber, metal fiber or the like, is used as the gas diffusion layer base material to provide electron conductivity. Typically, the gas diffusion layer base material is carbon paper, carbon felt, carbon fiber woven fabric, or the like.

There are differences in the gas diffusibility, electron conductivity, and water permeability of a manufactured gas diffusion layer due to differences in the basis weight and thickness of the carbon paper, carbon felt, or carbon fiber woven fabric used therein. Because carbon paper and carbon felt comprise carbon fibers arranged at random, the fiber arrangement does not cause much difference in the gas diffusibility and water permeability. However, a carbon fiber woven fabric is woven such that carbon fibers are regularly arranged; and the weave of the fabric is another important or dominant factor affecting the gas diffusibility, electron conductivity, and water permeability. That is, unlike carbon paper and carbon felt, a carbon fiber woven fabric has a specific property that, while it may become a material having optimum characteristics for a gas diffusion layer base material, the weave of the fabric greatly affects its suitability for use as a gas diffusion layer base material. With such a specific property utilized well, however, it is possible to control the weave of a carbon fiber woven fabric to obtain optimum characteristics for a gas diffusion layer base material.

A typical gas diffusion layer is produced, for example, such that a coating for formation of a water repellent layer, prepared by dispersing carbon black and a fluorocarbon resin in water, is applied onto one side of a base material to form a water repellent conductive layer (hereinafter referred to as a water repellent layer). In this case, in addition to the properties of the coating and the method for applying the coating onto the base material, the properties of the base material surface significantly control the state of the water repellent layer formation.

The amount of water repellency required for the water repellent layer also differs depending on the operating condition of the fuel cell. When the cell is operated under a high humidification condition, the water repellency of the outermost surface of the gas diffusion layer in contact with the catalyst layer is preferably not very high. When the cell is operated under a low humidification condition, the aforementioned water repellency is preferably high. That is to say, in the case where the outermost surface of the catalyst-layer-contacting-side of the gas diffusion layer has strong water repellency, there occurs a strong action tending to confine water within the electrode even when the polymer electrolyte membrane is in a sufficiently humidified state.

In operation under a high humidification condition where a great amount of water is supplied from the outside, a low degree of water repellency is required because there is little need to confine water. On the other hand, in operation under a low humidification condition where a small amount of water is supplied from the outside, a higher degree of water repellency is preferred. Especially in operation under a high humidification condition, it is important to form the water repellent layer (hereinafter referred to as uniform water repellent layer) to have not only a controlled amount of water repellency on its outermost surface, but also to have a gradually attenuated water repellency from the catalyst-layer-contacting-side of the outermost surface of the gas diffusion layer to the separator-side-contacting side thereof. This structure permits a smooth discharge of excess water produced by the reaction within the operating cell, to the gas flow channel side, without clogging of the micropores within the gas diffusion layer with the excess water.

Methods for varying the water repellency of a water repellent layer include: (1) varying a weight ratio between carbon black and a fluorocarbon resin in the water repellent layer and (2) varying the thickness of the water repellent layer or an applied amount of a coating for forming the water-repellent layer while keeping the weight ratio unchanged. However, with these methods, direct application of the coating for the water-repellent layer onto a carbon fiber woven fabric would result in priority infiltration of the coating into a portion of the base material having a low fiber density. As a result of the above considerations, it is difficult to uniformly apply the coating.

Occurrence of such non-uniform infiltration of the coating would lead to formation of a non-uniform water repellent layer within the gas diffusion layer, where portions with strong water repellency and portions with weak water repellency exist at random. The gap between the portions with strong water repellency is apt to trap water therein, and the trapped water is not readily discharged. In other words, due to the occurrence of non-uniform infiltration of the coating, as described above, it would become impossible to form a uniform water repellent layer and thus impossible to effectively discharge excess water. Because non-uniform infiltration of a coating into a base material would significantly impair water permeability of the gas diffusion layer, it is important, particularly in a fuel cell operated under a high humidification condition, to inhibit such non-uniform infiltration and to form a uniform water repellent layer.

Although a coating having a high degree of viscosity has been considered for preventing the non-uniform infiltration effect, no coating of this type has been produced that adequately inhibits the non-uniform infiltration.

One method for forming a non-uniform water repellent layer includes applying a coating onto a different sheet to form a water repellent layer and then transfer-printing the resultant water repellent layer onto a gas diffusion layer base material made of carbon. However, this transfer-printing method has a drawback that the number of processing steps increases.

Furthermore, a conventional carbon fiber woven fabric for use as a gas diffusion layer base material has concave portions and convex portions with relatively large surface level differences therebetween. As a result, a problem exists in that a large number of gaps are formed in the junction between the catalyst layer and the gas diffusion layer. The gaps may become clogged with water during operation of the PEFC, thereby deteriorating the ability of the gas diffusion layer to discharge water. As thus described, in a PEFC operated under a high humidification condition, despite the possibility that the use of a carbon fiber woven fabric as a gas diffusion layer base material may provide optimum characteristics for the gas diffusion layer base material, such optimization has not currently been carried out.

SUMMARY OF THE INVENTION

The present invention has an objective of solving the aforementioned problems with the conventional PEFC, especially with the gas diffusion layer therein.

Accordingly, an object of the present invention is to provide an MEA suitable for operation under a high humidification condition by smoothing the surface of a carbon fiber woven fabric to be used as a gas diffusion layer base material. A further object of the invention is to improve or optimize the surface of a carbon fiber woven fabric, used as a base material of a gas diffusion layer, so as to form thereon a uniform water repellent layer in which non-uniform infiltration of a coating for water-repellent-layer formation is inhibited.

In accordance with the present invention, an electrolyte membrane-electrode assembly for fuel cells includes a polymer electrolyte membrane interposed between a pair of electrodes. Each of the electrodes includes a catalyst layer in contact with the polymer electrolyte membrane and a gas diffusion layer which has a water repellent layer in contact with the catalyst layer. The base material of the gas diffusion layer is made of an electron conductive carbon fiber woven fabric, which is obtained by weaving a warp and a weft each comprising electron conductive carbon fiber and forming an opening adjacent crossing points of the warp and the weft. In one aspect of the invention, the warp and weft can each consist of, or consist essentially of, electron conductive carbon fiber.

In one embodiment, the relationship about $1/1500 \leq (10/W-Y)(10/Z-X)/XY \leq$ about $1/5$ is satisfied, where the carbon fiber woven fabric has a warp density of Z threads/cm, a weft density of W threads/cm, a warp thickness of X mm, and a weft thickness of Y mm.

In another embodiment, the carbon fiber woven fabric has a thickness in a range of about 0.05 mm to about 0.3 mm.

In still another embodiment, the carbon fiber woven fabric has a density in a range of about 0.32 g/cc to about 0.42 g/cc.

In a further embodiment, one of the warp density and the weft density of the carbon fiber woven fabric is in the range of about 16 threads/cm to about 45 threads/cm and the other of the two densities is in the range of about 12 threads/cm to about 40 threads/cm.

Additionally, the present invention provides a method of operating a fuel cell having the aforementioned electrolyte membrane-electrode assembly for fuel cells, whereby electric power is generated by providing a supply of a humidified fuel gas to the anode and a supply of a humidified oxidant gas to the cathode. The method includes controlling the dew point of the fuel gas and the dew point of the oxidant gas to temperatures approximately equivalent to, or approximately 5° C. or less lower than, the temperature of the electrolyte membrane-electrode assembly in operation.

The present invention also provides a fuel cell electrode having a gas diffusion layer which includes a base material made of an electron conductive fabric. The fabric is obtained by weaving a warp and a weft comprising electron conductive fiber, such that the relationship about $1/1500 \leq (10/W-Y)(10/Z-X)/XY \leq$ about $1/5$ is satisfied, where the fabric has a warp density of Z threads/cm, a weft density of W threads/cm, a warp thickness of X mm, and a weft thickness of Y mm.

Moreover, the present invention provides a fuel cell electrode having a gas diffusion layer including a base material made of an electron conductive fabric. The fabric is obtained by weaving a warp and a weft each comprising electron conductive fiber, such that one of a warp density and a weft density of the fabric is in the range of about 16 threads/cm to about 45 threads/cm, and the other of the two densities is in the range of about 12 threads/cm to about 40 threads/cm.

In each of the embodiments of this invention, the warp and weft can each consist of, or consist essentially of, electron conductive carbon fiber.

While the novel features of the invention are set forth particularly in the appended claims, the invention, both as to organization and content, will be better understood and appreciated, along with other objects and features thereof, from the following detailed description taken in conjunction with the attached drawings.

DETAILED DESCRIPTION

The present invention provides an electrolyte membrane-electrode assembly (MEA), suitable for operation under a high humidification condition, by controlling a fabric construction of a carbon fiber woven fabric to be used as a gas diffusion layer base material in a polymer electrolyte fuel cell (PEFC). By controlling the fabric construction, the surface condition of the carbon fiber woven fabric may be improved or optimized. Also, the invention achieves an improved or optimized application condition for applying a coating to form a water-repellent layer on the carbon fiber woven fabric.

The base material of the gas diffusion layer in the present invention is made of a carbon fiber woven fabric obtained by weaving a warp and a weft each comprising electron conductive carbon fiber, where an opening is formed adjacent crossing points of the warp and the weft.

In one embodiment, the carbon fiber woven fabric used for the MEA is characterized in that the relationship about $1/1500 \leqq (10/W-Y)(10/Z-X)/XY \leqq$ about $1/5$ is satisfied, where the carbon fiber woven fabric has a warp density of $Z$ threads/centimeter (cm), a weft density of $W$ threads/cm, a warp thickness of $X$ millimeters (mm) and a weft thickness of $Y$ mm. In the above relational expression, $XY$ mm$^2$ corresponds to the area of the portions where the warp thread crosses the weft thread (hereinafter referred to as crossing portions), and $(10/W-Y)(10/Z-X)$mm$^2$ corresponds to the area of the opening portions where neither the warp thread nor the weft thread exists (hereinafter referred to as opening portions). More specifically, the carbon fiber woven fabric in one embodiment of the present invention is characterized in that the area ratio of the opening portions to the crossing portions $(10/W-Y)(10/Z-X)/XY$ is not less than about $1/1500$ and not more than about $1/5$. The above relation means that the area of opening portions where neither a warp nor a weft thread exists is decreased relative to the area of the crossing portions where warp threads cross the weft threads, so as to make the ratio between the two areas in the range of about $1/1500$ to about $1/5$.

The carbon fiber woven fabric to be used as the gas diffusion layer base material is formed of carbon fiber thread. The fabric structure can be a plain weave or other weave structures, such as a twill or satin weave structure etc. In whatever weave structure is used for the carbon fiber woven fabric, warp threads and weft threads are regularly combined in a geometrical pattern. More specifically, a carbon woven fiber fabric is constituted such that carbon fiber threads (warp threads or weft threads) of a first group, arranged mutually in parallel, are sequentially combined approximately at right angles with carbon fiber threads (weft threads or warp threads) of a second group in a prescribed method. The carbon fiber threads belonging to the second group are also kept mutually approximately parallel.

Figure 1:
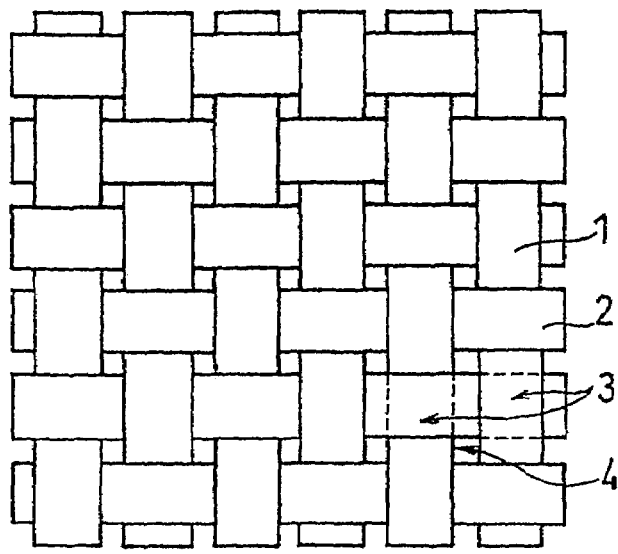
FIG. 1 is a plan view of a carbon fiber woven fabric according to the present invention.

Referring now to FIG. 1, a fabric structure of a carbon fiber woven fabric will be described for a plain weave carbon fiber woven fabric. FIG. 1 is a plan view of a plain weave carbon fiber woven fabric, in which approximately equally spaced warp threads 1 cross approximately equally spaced weft threads 2 at approximately right angles. Although warp and weft threads 1 and 2 are illustrated as being equally spaced, other spacing configurations known to those skilled in the art may be employed also. Warp threads 1 and weft threads 2 may be comprised of a single thread or multiple threads, such as twines made of at least two threads. The cross sections of warp thread 1 and weft thread 2 may be circular in form or of any other form known to those skilled in the art. However, for convenience of illustration, in FIG. 1, the thickness of warp thread 1 and the thickness of weft thread 2 also represent the respective widths of the warp and weft threads.

The area of opening portions 4, where neither warp thread 1 nor weft thread 2 exists, is smaller relative to the area of crossing portions 3, where warp thread 1 crosses weft thread 2. Opening portions 4 are adjacent crossing portions 3, as shown in FIG. 1. The ratio between the two areas (i.e., between the areas of the opening portions 4 and the crossing portions 3) is preferably approximately 1/1500 to approximately 1/5, but other range values are also within the scope of the invention. Thereby, when a coating for water-repellent-layer formation is applied onto the carbon fiber woven fabric, priority infiltration of the coating from the opening portions 4 is inhibited, allowing formation of a uniform water repellent layer. This makes it possible to obtain a gas diffusion layer having a characteristic that water repellency is gradually attenuated with a gentle slope or gradient from the catalyst-layer-contacting-side of the surface to the gas-flow-channel-side of the surface. An MEA having such a gas diffusion layer provides smooth discharge of excess water into gas flow channels and reduces or prevents the trapping of water within the micropores of the gas diffusion layer, even when operating under a high humidification condition.

In prior systems, a problem occurs when multiple MEAs are stacked and then clamped to constitute a PEFC. Increasing the clamping pressure to reduce the contact resistance between constituents would tend to cause a physical deflection of the constituents. To avoid this deflection, the clamping pressure must be kept low within a range that adequately prevents gas leakage. But with a low clamping pressure, gaps are produced in the interface between the catalyst layer and the gas diffusion layer, along with concavities and convexities of the base material. Since the gaps are apt to become clogged with water, a problem arises in that the excess water is not discharged out of the MEAs.

To solve the aforesaid problem, the present invention increases the area ratio of opening portions 4 to crossing portions 3 of the carbon fiber woven fabric. As a result, the surface level difference between the concave portions and convex portions is reduced and the surface is thus smoothed. That is, the carbon fiber woven fabric of the present invention has a surface with a small level difference between concave portions and convex portions because the area of crossing portions 3 (of a larger thickness) is approximately 5 to 1500 times as large as the area of opening portions 4 (of a smaller thickness). The use of this carbon fiber woven fabric can prevent the formation of gaps in the interface between the catalyst layer and the gas diffusion layer and thereby reduce or prevent the occurrence of excess water clogging the micropores of the gas diffusion layer.

As thus described, a PEFC using the MEA in accordance with the present invention, which comprises a gas diffusion layer having a uniform water repellent layer formed on a smooth surface of a carbon fiber woven fabric, provides a high discharge capacity for discharging excess water when operating under a high humidification condition.

For a carbon fiber woven fabric used as a gas diffusion layer base material, when an area ratio of opening portions 4 to crossing portions 3 exceeds approximately 1/5, the surface of the fabric becomes insufficiently smooth and it becomes impossible to sufficiently inhibit non-uniform water-infiltration of a coating. On the other hand, when the area ratio is below approximately 1/1500, pores within the gas diffusion layer become too small to provide sufficient gas diffusibility and water permeability.

The carbon fiber woven fabric to be used for the MEA of the present invention has a thickness that is preferably in the range of approximately 0.05 mm to approximately 0.30 mm and more preferably in the range of approximately 0.05 mm to approximately 0.20 mm. Reduction of the thickness of the carbon fiber woven fabric can make the level difference between the concave portions and convex portions on the fabric surface smaller and the surface smoother. It is thereby possible to more effectively prevent the junction between the gas diffusion layer and the catalyst layer from being clogged with water, so that an MEA capable of more effectively preventing occurrence of the flooding phenomenon in operation under a high humidification condition can be provided.

The thinner a carbon fiber woven fabric is made, the smaller the volume of gaps within a gas diffusion layer and the smaller the amount of water that will stay within the gas diffusion layer. Hence, the water can be readily discharged from the gas diffusion layer. For a carbon fiber woven fabric having a thickness less than approximately 0.05 mm, however, it often happens that the handling thereof is difficult or the carbon fiber woven fabric cannot be woven because the carbon fiber thread has insufficient tensile strength. As for a carbon fiber woven fabric having a thickness over approximately 0.30 mm, on the other hand, a level difference between concave portions and convex portions on the surface of the carbon fiber woven fabric increases. This increased level difference tends to cause the junction between the gas diffusion layer and the catalyst layer to clog with water.

It is preferable that the carbon fiber woven fabric for use in the MEA of the present invention has a density in the range of approximately 0.32 grams/cubic centimeter (g/cc) to approximately 0.42 g/cc. With the fabric density of the carbon fiber woven fabric kept low, the carbon fiber woven fabric is compressed by pressure applied at the time of clamping the stacked fuel cell. As a result, it thus becomes easier to smooth the surface of the carbon fiber woven fabric.

In such a manner, with the carbon fiber woven fabric compressed for smoothing, the level difference between the convex portions and concave portions becomes smaller to allow elimination of gaps, which may be clogged with water, between the junction of the gas diffusion layer and the catalyst layer. As a result, there is achieved an MEA capable of more effectively preventing the flooding phenomenon in an operation under a high humidification condition. The lower the density of the carbon fiber woven fabric, the larger the above effect is. However, when a carbon fiber woven fabric has a density smaller than approximately 0.32 g/cc, the mechanical strength of the carbon fiber woven fabric is so low that it becomes difficult to handle the carbon fiber woven fabric in production of an MEA. When a carbon fiber woven fabric has a density larger than approximately 0.42 g/cc, on the other hand, the carbon fiber woven fabric is not sufficiently smoothed by the clamping pressure, making it impossible to sufficiently obtain the aforementioned effect.

In the carbon fiber woven fabric for use in the MEA of the present invention, it is preferable to provide one of the warp density and the weft density to be in the range of approximately 16 threads/cm to approximately 45 threads/cm, and the other thereof to be in the range of approximately 12 threads/cm to approximately 40 threads/cm. By increasing the thread density (the number of threads of a carbon fiber woven fabric per unit length or width), the thickness per one thread is made smaller. Therefore, it is possible to reduce the thickness of the crossing portions and to thereby decrease the level difference between the convex portions and concave portions on the carbon fiber woven fabric surface. This leads to a still smoother surface of the carbon fiber woven fabric and further permits formation of a uniform water repellent layer.

Moreover, increasing the thread density may also increase the number of threads and thereby increase the number of gaps between adjacent threads. As the number of threads and gaps increase per unit area, the gap portions become increasingly smaller in area. As a result, it becomes possible to form a large number of fine spaces suitable for smoothly discharging excess water out of the MEA through the gas diffusion layer, or for dispersing the reaction gas within the gas diffusion layer. These effects bring about the smooth discharge of excess water in an operation under a high humidification condition, thereby providing an MEA capable of more effectively preventing occurrence of the flooding phenomenon.

The higher the warp density and the weft density of the carbon fiber woven fabric, the more significantly the above effect can be obtained. However, in the case where a carbon fiber woven fabric has a density beyond the aforementioned favorable range, the thread is so thin that it becomes difficult to weave and the carbon fiber woven fabric becomes difficult to handle. In the case where a carbon fiber woven fabric has a density below the aforesaid favorable range, on the other hand, the thread is so thick as to cause an increase in level difference between the convex portions and concave portions on the carbon fiber woven fabric surface. When an MEA is produced using this carbon fiber woven fabric, gaps which may clog with water tend to be formed in the junction between the catalyst layer and the gas diffusion layer.

As the water repellent material to be included in the water repellent layer, a fluorocarbon resin, such as polytetrafluoroethylene (PTFE), may be used due to its excellent thermal resistance, acid resistance, and chemical resistance. Silicone type materials and other water repellent materials capable of securing water repellency for a long period of time can also be used. Because the water repellent layer is formed on one side of the gas diffusion layer, which functions as a current collector and is thus required to have electron conductivity, it is necessary that an electron conductive material be included in the water repellent layer.

Carbon-based materials may be used as the electron conductive material due to their excellent acid resistance properties. Among these carbon-based materials, acetylene black is advantageous due to its strong water repellency. Because it is difficult to produce a coating from a carbon material having strong water repellency, however, there are cases where Ketjen Black®, which is a hydrophilic carbon, may be more preferable, depending on how the carbon is combined with the water repellent material. Other electron-conductive materials include metal materials.

A typical method of forming a water repellent layer is to directly apply a coating for water-repellent-layer formation, prepared by dispersing the water repellent material and electron conductive material in a dispersing medium such as water, onto one side of the carbon fiber woven fabric. The application method may be any of spraying, spin coating, doctor blading, screen printing, coater applying, and gravure printing.

The gas flow channel formed in the separator plate may be a straight-type gas flow channel, a serpentine-type gas flow channel, or other configurations known to those skilled in the art. The straight-type gas flow channel may have multiple straight paths arranged approximately in parallel with each other in one direction from the inlet to the outlet of the separator plate. The serpentine-type gas flow channel has a single path or multiple paths arranged to travel in a serpentine line. Shapes of the gas flow channel are classified into crossing-type, facing-type and parallel-type, depending on the difference in the directions of the flowing gasses at the anode side and the cathode side. The present invention can be effectively applied to a PEFC having any of the aforementioned types of gas flow channels.

The present invention also provides an operation method for a PEFC including the MEA in accordance with the present invention and a pair of separator plates having the gas flow channel in contact with the external side of the MEA. According to this method, a dew point of a fuel gas, a dew point of an oxidant gas, and the temperature of the MEA in operation are controlled within prescribed temperature ranges as described below.

The MEA of the present invention includes a gas diffusion layer in which a uniform water repellent layer, substantially free from non-uniform infiltration of the coating for water-repellent-layer formation, is formed on the carbon fiber woven fabric with a smooth surface, as thus described. Thereby, this MEA sufficiently discharges excess water and diffuses a gas, as required for operation under a high humidification condition of a PEFC. The PEFC comprising this MEA therefore demonstrates an excellent performance, especially when operated under a high humidification condition.

Figure 3:
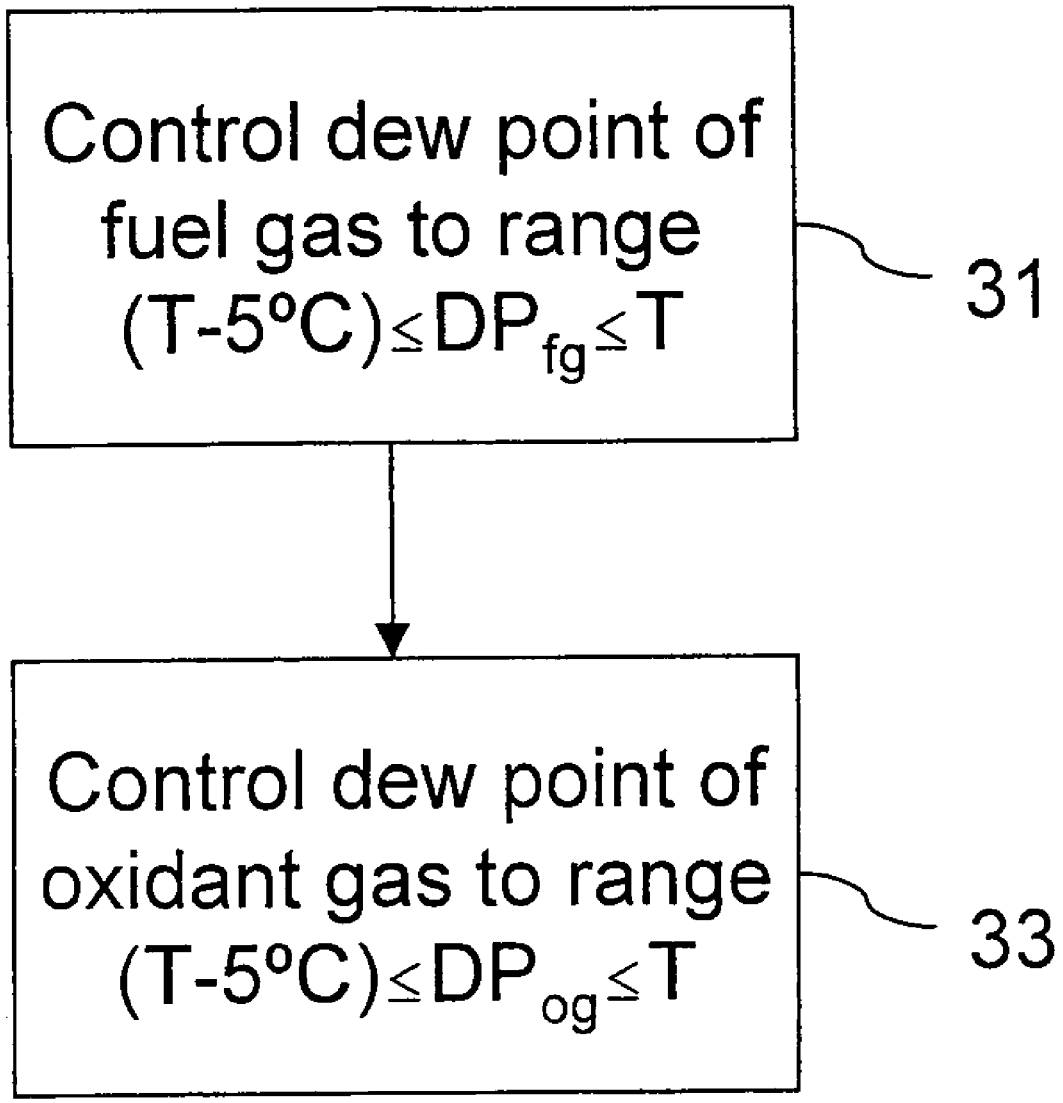
FIG. 3 illustrates a method, according to the present invention, of operating a PEFC under a high humidity condition.

FIG. 3 illustrates a method of operating a PEFC under a high humidification condition. According to this method, the dew point of the fuel gas supplied to the anode is controlled in step 31 to be within the range of $(T-5°C.) \leq DP_{fg} \leq T$, where T is the temperature of the electrolyte membrane-electrode assembly and $DP_{fg}$ is the dew point of the fuel gas supplied to the anode. Also, the dew point of the oxidant gas supplied to the cathode is controlled in step 33 to be within the range of $(T-5°C.) \leq DP_{og} \leq T$, where T is the temperature of the electrolyte membrane-electrode assembly and $DP_{og}$ is the dew point of the oxidant gas supplied to the anode. By controlling the dew point of the fuel gas and the dew point of the oxidant gas to temperatures 5° C. or less lower than the temperature of the electrolyte membrane-electrode assembly in operation, excellent performance can be obtained.

EXAMPLES

Next, the present invention will be described more specifically by way of examples. In each of the examples and comparative examples, a unit cell was fabricated as described below.

Figure 2:
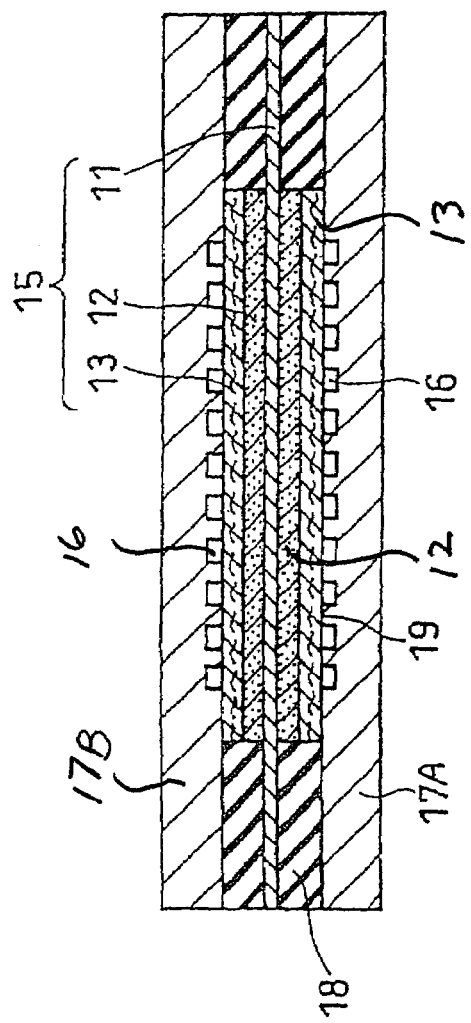
FIG. 2 is a vertical sectional view of a unit cell comprising an electrolyte membrane-electrode assembly in an embodiment of the present invention.

FIG. 2 is a representative view of a unit cell structure prepared in each Exemplary Example and each Comparative Example. Onto one side of a plain carbon fiber woven fabric, a coating for water-repellent-layer formation was applied by doctor blading. This coating was prepared by mixing acetylene black (AB) with water at a weight ratio of 1:4. A small amount of surfactant was added to the mixture, and thereafter the mixture was kneaded. The kneaded mixture was added to a PTFE dispersion (D1 manufactured by Daikin Industries, Ltd.) such that the weight ratio of the PTFE solid content to AB was 1:7. The carbon fiber woven fabric with this coating applied onto one side thereof was dried at about 100° C. for one hour and then baked at about 270° C. for one hour, to produce a gas diffusion layer 13 in which a water repellent layer was formed on the carbon fiber woven fabric.

A catalyst layer 12 was attached by transfer printing onto each side of a polymer electrolyte membrane 11 (Nafion 112® manufactured by DuPont, USA), having a perfluorosulfonic acid resin throughout, except for the periphery thereof. Subsequently, each of the gas diffusion layers 13, produced as described above, was attached to each of the catalyst layers 12, such that the water-repellent-layer-side of each gas diffusion layer 13 was in contact with the outer surface of the corresponding catalyst layer 12, to produce an MEA 15.

Catalyst layer 12 to be transfer-printed onto polymer electrolyte membrane 11, was formed by applying a catalyst paste onto a resin sheet, followed by drying. The area of catalyst layer 12 in the MEA was 25 cm². The catalyst paste was prepared by mixing 100 parts by weight of a catalyst, obtained by carrying a platinum catalyst on a carbon fine powder (Ketjen Black EC®, manufactured by Lion Corporation) at a weight ratio of 1:1, with 80 parts by weight of a perfluorosulfonic acid resin dispersed in ethanol. The obtained mixture was introduced into a mixed dispersing medium of water and ethanol and stirred.

A gasket 18 was then disposed on each side of the polymer electrolyte membrane 11 on the periphery of the MEA 15 and was hot pressed at 100° C. for 5 minutes for attachment. The resultant assembly was sandwiched from one side thereof by a cathode-side carbon-made separator plate 17A and from another side by an anode-side carbon-made separator plate 17B. Separator plates 17A and 17B were clamped such that a surface pressure of about 7 kilogram-feet/square centimeter (kgf/cm²) was applied to ribs 19 formed on separator plates 17A and 17B, to fabricate a unit cell of a PEFC. The cathode-side and anode-side separator plates 17A and 17B were each provided with a serpentine-type gas flow channel 16 having three grooves with a cross-sectional area of 1.0 cm².

The thicknesses of the warp thread and the weft thread of the carbon fiber woven fabric used in the exemplary and comparative examples were measured by means of a scanning electron microscopy (SEM) photograph at a magnification of 100 times and an accelerating voltage of 15 kilovolts (kV). The number of threads per 1 cm (warp thread density and weft thread density) was calculated by measuring the number of threads per 5 cm in a micrograph, at a magnification of 25 times, and then calculating an average value per 1 cm from the above-measured value. The carbon fiber woven fabric was punched out into a size of 12 cm×12 cm and the weight thereof was measured, from which the basis weight of the carbon fiber woven fabric was calculated. The density of the carbon fiber woven fabric was determined from the above-calculated basis weight and the thickness thereof.

Exemplary Example 1

A carbon fiber woven fabric, woven by warp threads that each included a twine and had a thickness of 0.48 mm and weft threads that each included a twine and had a thickness of 0.48 mm, was used as a gas diffusion layer base material to fabricate a unit cell. The carbon fiber woven fabric had a warp thread density of 20.1 threads/cm, a weft thread density of 18.1 threads/cm, a basis weight of 110 g/m², a thickness of 0.28 mm, and a density of 0.393 g/cc.

Exemplary Example 2

A carbon fiber woven fabric, woven by warp threads that each included a twine and had a thickness of 0.45 mm and weft threads that each included a single yarn and had a thickness of 0.45 mm, was used as a gas diffusion layer base material to fabricate a unit cell. The carbon fiber woven fabric had a warp thread density of 17.7 threads/cm, a weft thread density of 15.4 threads/cm, a basis weight of 105 g/m², a thickness of 0.29 mm, and a density of 0.362 g/cc.

Exemplary Example 3

A carbon fiber woven fabric, woven by warp threads that each included a twine and had a thickness of 0.445 mm and weft threads that each included a twine and had a thickness of 0.445 mm, was used as a gas diffusion layer base material to fabricate a unit cell. The carbon fiber woven fabric had a warp thread density of 15.7 threads/cm, a weft thread density of 15.4 threads/cm, a basis weight of 80 g/m², a thickness of 0.20 mm, and a density of 0.400 g/cc.

Exemplary Example 4

A carbon fiber woven fabric, woven by warp threads that each included a twine and had a thickness of 0.36 mm and weft threads that each included a twine and had a thickness of 0.36 mm, was used as a gas diffusion layer base material to fabricate a unit cell. The carbon fiber woven fabric had a warp thread density of 23.6 threads/cm, a weft thread density of 22.00 threads/cm, a basis weight of 115 g/m$^2$, a thickness of 0.29 mm, and a density of 0.397 g/cc.

Exemplary Example 5

A carbon fiber woven fabric, woven by warp threads that each included a twine and had a thickness of 0.465 mm and weft threads that each included a twine and had a thickness of 0.47 mm, was used as a gas diffusion layer base material to fabricate a unit cell. The carbon fiber woven fabric had a warp thread density of 21.3 threads/cm, a weft thread density of 20.1 threads/cm, a basis weight of 125 g/m$^2$, a thickness of 0.30 mm, and a density of 0.417 g/cc.

Comparative Example 1

A carbon fiber woven fabric, woven by warp threads that each included a twine and had a thickness of 0.42 mm and weft threads that each included a twine and had a thickness of 0.42 mm, was used as a gas diffusion layer base material to fabricate a unit cell. The carbon fiber woven fabric had a warp thread density of 15.7 threads/cm, a weft thread density of 15.7 threads/cm, a basis weight of 114 g/m$^2$, a thickness of 0.30 mm, and a density of 0.380 g/cc.

Comparative Example 2

A carbon fiber woven fabric, woven by warp threads that each included a twine and had a thickness of 0.47 mm and weft threads that each included a twine and had a thickness of 0.47 mm, was used as a gas diffusion layer base material to fabricate a unit cell. The carbon fiber woven fabric had a warp thread density of 21.3 threads/cm, a weft thread density of 17.3 threads/cm, a basis weight of 100 g/m$^2$, a thickness of 0.27 mm, and a density of 0.370 g/cc.

A variety of cell tests were conducted, as described below, on each of the unit cells produced according to Exemplary Examples 1-5 and Comparative Examples 1 and 2, where a variety of carbon fiber woven fabrics were produced by varying the weaves thereof as thus described. For each cell test, a voltage produced by the operating cell was measured across the anode and cathode electrodes of the cell.

Cell Test 1

A fuel gas (hydrogen gas) heated and humidified so as to have a dew point of 70° C. and an oxidant gas (air) heated and humidified so as to have a dew point of 70° C. were respectively supplied to the anode and the cathode of the cell. The temperature of the MEA in operation was 70° C. The hydrogen gas utilization rate was 70%, and the air utilization rate was 40%.

Cell Test 2

The same conditions used for Cell Test 1 were used here with the exception that the air utilization rate was varied from 40% to 80%, and then a battery test 2 was conducted at air utilization rate 80%.

Cell Test 3

The dew point of the hydrogen gas supplied to the anode was 67° C., and the dew point of the air supplied to the cathode was 70° C. The temperature of the MEA in operation was 70° C., and the fuel gas utilization rate was 70%. The air utilization rate was 40%.

Cell Test 4

The same conditions used for Cell Test 3 were used here with the exception that the air utilization rate was varied from 40% to 80%, and then a battery test 4 was conducted at air utilization rate 80%.

Cell Test 5

The dew point of the hydrogen gas supplied to the anode was 67° C., and the dew point of the air supplied to the cathode was 65° C. The temperature of the MEA in operation was 70° C., and the fuel gas utilization rate was 70%. The air utilization rate was 40%.

Cell Test 6

The same conditions used for Cell Test 5 were used here with the exception that the air utilization rate was varied from 40% to 80%, and then a battery test 6 was conducted at air utilization rate 80%.

Cell Test 7

The dew point of the hydrogen gas supplied to the anode was 65° C., and the dew point of the air supplied to the cathode was 65° C. The temperature of the MEA in operation was 70° C., and the fuel gas utilization rate was 70%. The air utilization rate was 40%.

Cell Test 8

The same conditions used for Cell Test 7 were used here with the exception that the air utilization rate was varied from 40% to 80%, and then a battery test 8 was conducted at air utilization rate 80%.

Cell Test 9

The dew point of the hydrogen gas supplied to the anode was 65° C., and the dew point of the air supplied to the cathode was 55° C. The temperature of the MEA in operation was 70° C., and the fuel gas utilization rate was 70%. The air utilization rate was 40%.

Cell Test 10

The same conditions used for Cell Test 9 were used here with the exception that the air utilization rate was varied from 40% to 80%, and then a battery test 10 was conducted.

The current density during each of Cell Tests 1-10 was 0.3 A/cm$^2$, while the cell voltage was being measured. Table 1 shows the respective area ratios of the gap portions to the crossing portions $(10/W-Y)(10/Z-X)/XY$ of the carbon fiber woven fabrics used for Exemplary Examples 1-5 and Comparative Examples 1 and 2. This table also lists the respective operating voltage values measured in Cell Tests 1 to 10. In Table 1, the aforesaid area ratio is simply represented by "area ratio" as a matter of convenience.

TABLE 1

| | E.E. 1 | E.E. 2 | E.E. 3 | E.E. 4 | E.E. 5 | C.E. 1 | C.E. 2 |
|---|---|---|---|---|---|---|---|
| Area Ratio | 1/177 | 1/9 | 1/5 | 1/22 | 1/1449 | 1/4 | 1/5560 |
| *A | 0.731 | 0.729 | 0.726 | 0.730 | 0.736 | 0.718 | 0.621 |
| *B | 0.719 | 0.715 | 0.712 | 0.715 | 0.727 | 0.658 | 0.405 |
| A–B (V) | 0.012 | 0.014 | 0.014 | 0.015 | 0.009 | 0.060 | 0.216 |
| *C | 0.727 | 0.721 | 0.718 | 0.724 | 0.732 | 0.708 | 0.633 |

TABLE 1-continued

|     | E.E. 1 | E.E. 2 | E.E. 3 | E.E. 4 | E.E. 5 | C.E. 1 | C.E. 2 |
|-----|--------|--------|--------|--------|--------|--------|--------|
| *D  | 0.718  | 0.714  | 0.709  | 0.711  | 0.726  | 0.688  | 0.477  |
| C-D (V) | 0.009 | 0.007 | 0.009 | 0.013 | 0.006 | 0.020 | 0.156 |
| *E  | 0.724  | 0.709  | 0.701  | 0.712  | 0.728  | 0.680  | 0.662  |
| *F  | 0.718  | 0.708  | 0.700  | 0.710  | 0.727  | 0.655  | 0.583  |
| E-F (V) | 0.006 | 0.001 | 0.001 | 0.002 | 0.001 | 0.015 | 0.079 |
| *G  | 0.724  | 0.700  | 0.698  | 0.709  | 0.728  | 0.651  | 0.676  |
| *H  | 0.717  | 0.688  | 0.684  | 0.704  | 0.726  | 0.648  | 0.621  |
| G-H (V) | 0.007 | 0.002 | 0.005 | 0.005 | 0.002 | 0.003 | 0.055 |
| *I  | 0.712  | 0.663  | 0.637  | 0.687  | 0.724  | 0.610  | 0.723  |
| *J  | 0.716  | 0.681  | 0.659  | 0.698  | 0.724  | 0.643  | 0.722  |
| I-J (V) | -0.004 | -0.018 | -0.022 | -0.011 | -0.000 | -0.033 | 0.001 |

E.E. n: Exemplary Structure n
C.E. n: Comparative Structure n
*A: Operating voltage (V) in cell test 1
*B: Operating voltage (V) in cell test 2
*C: Operating voltage (V) in cell test 3
*D: Operating voltage (V) in cell test 4
*E: Operating voltage (V) in cell test 5
*F: Operating voltage (V) in cell test 6
*G: Operating voltage (V) in cell test 7
*H: Operating voltage (V) in cell test 8
*I: Operating voltage (V) in cell test 9
*J: Operating voltage (V) in cell test 10

Referring to Table 1, the operating voltage differences, A-B, C-D, E-F, G-H and I-J, identify the change in operating voltage obtained by varying the air utilization rate from 40% to 80%, while maintaining the same conditions of the reaction gas humidification and the MEA temperature during the unit cell operation. In other words, A and B have the same conditions of reaction gas humidification and MEA temperature, while C and D have the same conditions of reaction gas humidification and MEA temperature, but the reaction gas humidification conditions are different for test pairs A-B, C-D, E-F, G-H and I-J, respectively, as is apparent from the above description of the cell tests.

A positive operating voltage difference indicates that the operating voltage at the air utilization rate of 40% is higher than the operating voltage at the air utilization rate of 80%. When the operating voltage difference is small, this indicates that the voltage variation due to the utilization rate (flow rate) of the air supplied to the cathode is small; this in turn means that a stable output can be obtained during the operation. On the other hand, when the operating voltage difference is large, this indicates that the operating voltage is apt to vary due to the flow rate of the air. Thus, when the flow rate of the air is lowered, the operation tends to be in a flooding state. With a flooding state condition at the lower flow rate of air, the relatively higher operating voltage in the test cells 1, 3, 5 and 7 indicates efficient removal of excess water.

When the operating voltage difference is negative, this indicates that the operation tends to be in somewhat of a dry state at the higher air utilization rate because otherwise the operating voltage value would tend to increase as the air flow rate is lowered.

As may be determined from Table 1, the unit cells of Exemplary Examples 1-5 all employed carbon fiber woven fabrics having area ratios, (10/W-Y)(10-Z-X)/XY, within the range of 1/1500 to 1/5, and Comparative Examples 1 and 2 had respective area ratios slightly outside each end of this range. Exemplary Examples 1-5 exhibited higher operating voltages for each of Cell Tests 1-8 than did either of Comparative Examples 1 and 2. The Exemplary Examples exhibited higher operating voltages because excess water produced by operating the cell under a high humidification condition was smoothly discharged by the particular fiber woven fabrics employed by the Exemplary Examples. In this regard, as noted above, I-J was in a somewhat dry state, and Comparative Example 2 exhibited relatively high operating voltages.

Comparative Examples 1 and 2 exhibited lower operating voltages in each of Cell Tests 1-6 and larger operating voltage differences, A-B, C-D and E-F, due to the difference in utilization rate (flow rate) of the air, than did Exemplary Examples 1-5. The inventors understand this is because water produced at the cathode was not smoothly discharged by the particular carbon fiber woven fabrics employed by these Exemplary Examples. As a result, a flooding condition was induced in the unit cells.

More specifically, it is theorized that in Comparative Example 1, a uniform water repellent layer was not formed because there were too many opening portions in the carbon fiber woven fabric. Excess water produced by the operation of the unit cell was not smoothly discharged because the level difference between the convex portions and concave portions on the surface was large. It is thought on the contrary that with respect to Comparative Example 2, the excess water was not smoothly discharged because there were too few opening portions in the carbon fiber woven fabric, thereby making it difficult for the excess water to penetrate through the gas diffusion layer.

For each of Exemplary Examples 1-5 and Comparative Example 1, the operating voltages observed in Cell Tests 9 and 10 are smaller than those observed in Cell Tests 1-8. Moreover, the differences in operating voltage (I-J) of these unit cells are either negative values or close to zero, indicating that the cell operation tends to be in somewhat of a dry state when air is supplied at a relatively low humidity (i.e., a dew point of 55° C.) to the cathode because otherwise the operating voltage would be lower at the higher air utilization rate.

For Comparative Example 2, because penetration of water through the gas diffusion layer is difficult, the operation does not tend to be in a dry state. Therefore, the operating voltage difference (I-J) is a positive value even in Cell Tests 9 and 10.

According to the above description, the present invention provides an electrolyte membrane-electrode assembly for polymer electrolyte fuel cells that has an excellent flooding-resistance characteristic in an operation under a high humidification condition, and that obtains a high operating voltage.

Although the present invention has been described in terms of the presently preferred embodiments, it is to be understood that such description is not intended to be interpreted as limiting the scope of the claims to the described embodiments. Various alterations and modifications will no doubt become apparent to those skilled in the art to which the present invention pertains, after having read the above disclosure. Accordingly, it is intended that the appended claims be interpreted as covering all alterations and modifications that fall within the true spirit and scope of the invention.

What is claimed is:

1. A gas diffusion layer for a fuel cell electrode, said gas diffusion layer comprising:
   a gas diffusion layer which has a water repellent layer for contacting with a catalyst layer of said electrode, wherein:
   a base material of said gas diffusion layer is made of an electron conductive carbon fiber woven fabric, comprising a weave of a warp comprising electron conductive carbon fiber and a weft comprising electron conductive carbon fiber, and an opening is formed adjacent crossing points of said warp and said weft, wherein:

the relationship about $1/1500 \leqq (10/W-Y)(10/Z-X)/XY \leqq$ about $1/5$ is satisfied where said carbon fiber woven fabric has a warp density of Z threads/cm, a weft density of W threads/cm, a warp thickness of X mm and a weft thickness of Y mm.

2. The gas diffusion layer of claim 1, wherein said fabric has a thickness in a range of about 0.05 mm to about 0.3 mm.

3. The gas diffusion layer of claim 1, wherein said fabric has a density in a range of about 0.32 g/cc to about 0.42 g/cc.

4. The gas diffusion layer of claim 1, wherein one of said warp density and said weft density of said carbon fiber woven fabric is in a range of about 16 threads/cm to about 45 threads/cm, and the other of said warp density and said weft density is in a range of about 12 threads/cm to about 40 threads/cm.

5. The gas diffusion layer of claim 2, wherein said carbon fiber woven fabric has a density in a range of about 0.32 g/cc to about 0.42 g/cc.

6. The gas diffusion layer of claim 2, wherein one of a warp density and a weft density of said carbon fiber woven fabric is in a range of about 16 threads/cm to about 45 threads/cm, and the other of said warp density and said weft density is in a range of about 12 threads/cm to about 40 threads/cm.

7. The gas diffusion layer of claim 3, wherein one of a warp density and a weft density of said carbon fiber woven fabric is in a range of about 16 threads/cm to about 45 threads/cm, and the other of said warp density and said weft density is in a range of about 12 threads/cm to about 40 threads/cm.

8. The gas diffusion layer of claim 7, wherein said carbon fiber woven fabric has a thickness in a range of about 0.05 mm to about 0.3 mm.

* * * * *